United States Patent
Foit

(10) Patent No.: US 9,015,207 B2
(45) Date of Patent: Apr. 21, 2015

(54) MOBILE SALES TRACKING SYSTEM

(71) Applicant: Touchstone Media Group, LLC, Zionsville, IN (US)

(72) Inventor: Michael Foit, Carmel, IN (US)

(73) Assignee: Touchstone Media Group, LLC, Zionsville, IN (US)

( * ) Notice: Subject to any disclaimer, the term of this patent is extended or adjusted under 35 U.S.C. 154(b) by 86 days.

(21) Appl. No.: 13/676,374

(22) Filed: Nov. 14, 2012

(65) Prior Publication Data

US 2013/0262528 A1   Oct. 3, 2013

Related U.S. Application Data

(60) Provisional application No. 61/617,522, filed on Mar. 29, 2012.

(51) Int. Cl.
| | |
|---|---|
| G06F 7/00 | (2006.01) |
| G06F 17/30 | (2006.01) |
| G06Q 30/00 | (2012.01) |
| G06Q 30/02 | (2012.01) |
| G06Q 30/06 | (2012.01) |
| G06F 15/16 | (2006.01) |

(52) U.S. Cl.
CPC ............ G06Q 30/0201 (2013.01); G06Q 30/06 (2013.01); *Y10S 707/947* (2013.01); *Y10S 707/951* (2013.01)

(58) Field of Classification Search
USPC ........................ 707/805, 951, 947; 705/14.51
See application file for complete search history.

(56) References Cited

U.S. PATENT DOCUMENTS

| | | | | |
|---|---|---|---|---|
| 7,415,424 | B1* | 8/2008 | Donner | 705/14.64 |
| 8,484,381 | B2* | 7/2013 | Fraley | 709/206 |
| 2003/0131023 | A1* | 7/2003 | Bassett et al. | 707/999.2 |
| 2003/0144873 | A1* | 7/2003 | Keshel | 705/1 |
| 2006/0265263 | A1* | 11/2006 | Burns | 705/8 |
| 2008/0005168 | A1* | 1/2008 | Huff et al. | 707/999.107 |
| 2009/0012704 | A1* | 1/2009 | Franco et al. | 707/999.003 |
| 2009/0044252 | A1* | 2/2009 | Kashima et al. | 709/206 |
| 2012/0130782 | A1* | 5/2012 | Ratnakar | 705/14.5 |
| 2013/0061261 | A1* | 3/2013 | Pakula | 725/32 |

* cited by examiner

*Primary Examiner* — Greta Robinson
*Assistant Examiner* — Brian E. Weinrich
(74) *Attorney, Agent, or Firm* — Quarles & Brady LLP

(57) ABSTRACT

Systems and methods for managing sales and marketing information. A mobile device is configured to display a screen that includes a plurality of icons. In response to activating the icons, the mobile device retrieves and transmits data associated with sales and marketing data obtained by canvassing a neighborhood and displays this data to the mobile device user. The data is maintained in system database so that all system users have access to updated data on sales associate availability for appointments, job status, and sales leads obtained from canvassing. The mobile device is further configured to display a map with symbols that indicate the location of addresses associated with sales and marketing data in the database. The mobile device user may retrieve data associated with an address by selecting one of the symbols. The symbols displayed are adjusted based on the map scale and mobile device location.

17 Claims, 7 Drawing Sheets

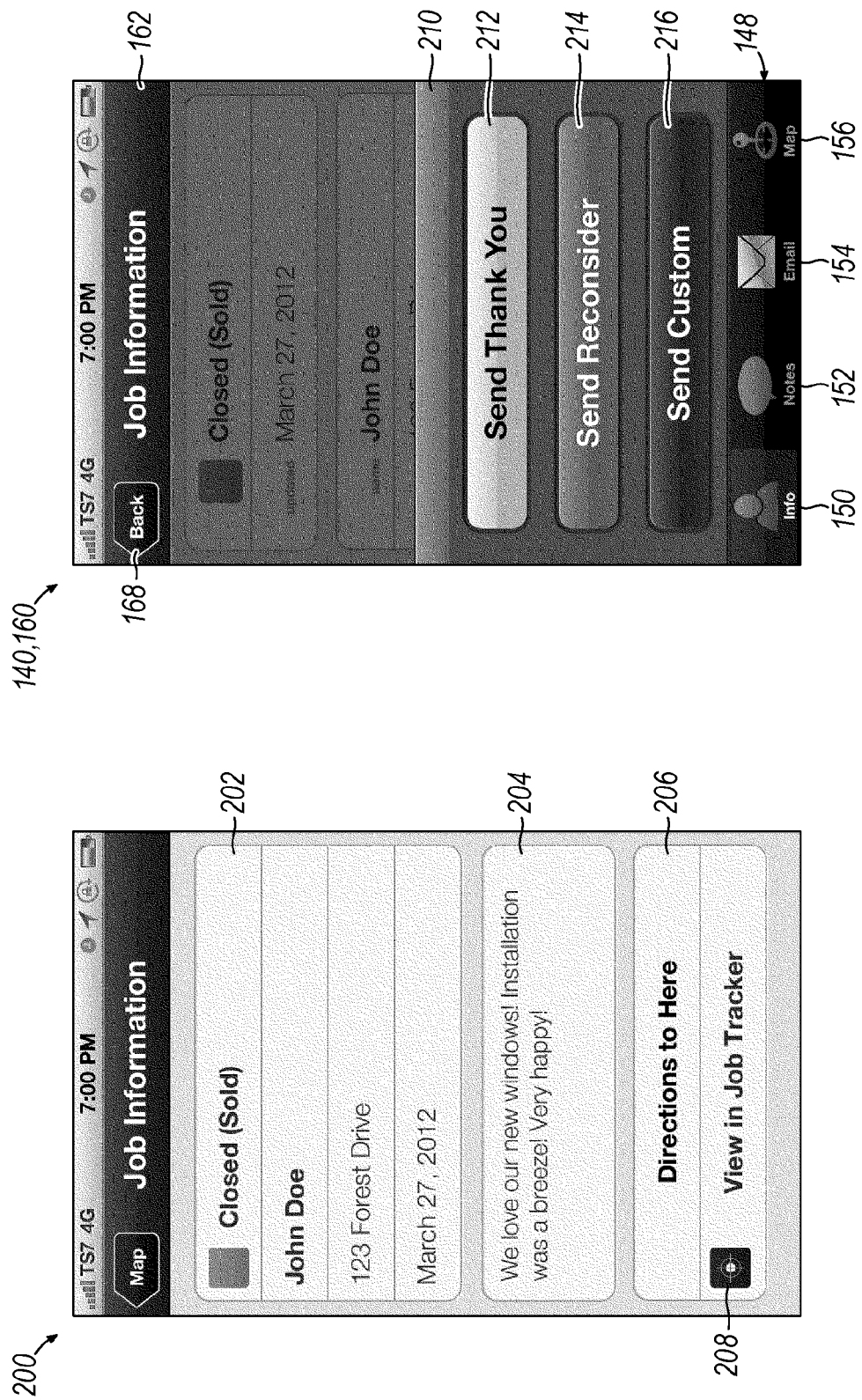

MOBILE SALES TRACKING SYSTEM

CROSS-REFERENCE TO RELATED APPLICATION

This application claims the filing benefit of U.S. Provisional Application Ser. No. 61/617,522, filed on Mar. 29, 2012 and entitled MOBILE SALES TRACKING SYSTEM, the disclosure of which is hereby incorporated by reference in its entirety.

FIELD OF THE INVENTION

The present invention relates to the management of sales and marketing information, and more specifically, to the creation, maintenance, and dissemination of customer information to salespersons and contractors in the home improvement and other industries.

BACKGROUND OF THE INVENTION

Sales leads may be generated through various ways of contacting potential customers. For example, salespersons may mail, e-mail or cold call persons meeting certain demographic criteria to prospect for potential customers. Salespersons may also go door-to-door to generate sales leads and develop marketplace data through direct contact with potential customers.

The home improvement industry, in particular, often relies on neighborhood canvassing to generate sales since visiting a home can provide useful information regarding what types of products the occupant may be interested in. Typically, when canvassing an area, a sales team will divide up the area into multiple geographic regions, and send one or more representatives to canvass each region. The marketing representative may go door-to-door down each street in their region until each house has been visited. To keep track of which homes have been visited and what the outcome of the visit was, the marketing representative may take notes, fill out standardized forms, or simply rely on their memory and report the results when they return to the main office.

Typically, in a portion of the homes visited or otherwise contacted, the occupant will either not be home, or will be unwilling to talk to the marketing representative. In cases where the homeowner is not home, the marketing representative or some other member of the sales team may wish to revisit or contact the home at a later time. However, to avoid annoying potential customers and wasting manpower on unproductive visits, it is important to distinguish visited homes where the homeowner was not present from those in which the homeowner was present, but showed a lack of interest in the product. In addition, when the homeowner does show interest, it is important to capture any useful information regarding the potential customer. This information may include products desired and details about the home, such as the general condition of the home, the types of materials from which the home is constructed, or a component of the home that appears to need replacing.

Typically, in order to keep track of which homes have been visited or otherwise contacted, and the outcome of the visit or contact, the marketing representatives will use paper to track their contacts. This paperwork will be turned in at the end of the day, and used to generate a file of market information and sales leads. However, the files are often not well organized or made readily available to sales associates. In particular, salespersons may fail to keep track of homes where there was no answer to reduce their paperwork burden. This may result in lost sales due to leads that are not followed up on in a timely manner and wasteful re-canvassing of neighborhoods and homes that were previously visited.

Therefore, there is a need for improved systems and methods of obtaining and disseminating marketing and sales information in the sales industry.

SUMMARY OF THE INVENTION

In an embodiment of the present invention, a method is provided for managing sales and marketing information. The method includes displaying a first screen on a user interface of a first mobile device, the first screen including an icon. In response to activation of the icon, a second screen is displayed that includes an address field and a notes field. Data is received in the address and the notes fields and transmitted to a system database. A database file is created in the system database that is accessible by a second mobile device. The database file is associated with the address in the address field and contains the address data and the notes data.

In another embodiment of the present invention, another method is provided for managing sales and marketing information. The method includes displaying a first screen on a user interface of a first mobile device, the first screen including an icon. The method further includes creating an appointment between a sales associate and a customer in response to activation of the icon, and creating a database file in a system database accessible by a second mobile device, the database file containing data regarding the appointment.

In another embodiment of the present invention, a mobile sales tracking system is provided. The system includes a first mobile device configured to create an appointment in response to input from a system user, and a database configured to receive data regarding the appointment from the first mobile device. The database is further configured to make the data available to a second mobile device different from the first mobile device.

In another embodiment of the present invention, a mobile sales tracking system is provided. The system includes a database, and a first mobile device in communication with the database. The first mobile device is configured to display a screen that includes an address field and a notes field, and to receive address data in the address field and notes data in the notes field. The first mobile device is further configured to transmit the address data and notes data to the database, and the database is configured to receive the transmitted data and generate a database file associated with the address in the address field. The database file contains the address data and the notes data, and is accessible by a second mobile device different from the first mobile device.

BRIEF DESCRIPTION OF THE DRAWINGS

The accompanying drawings, which are incorporated in and constitute a part of this specification, illustrate various embodiments of the invention and, together with the general description of the invention given above and the detailed description of the embodiments given below, serve to explain the embodiments of the invention.

FIG. 12 is a diagrammatic view of a ticket details screen displayed by the mobile device of FIG. 11 in response to activation of a push pin.

FIG. 13 is a diagrammatic view of an e-mail generation window displayed by the mobile device of FIGS. 9 and 10 in response to activation of an e-mail button.

DETAILED DESCRIPTION OF THE INVENTION

The present invention is directed to a touch and gesture controlled mobile software platform for tracking sales and marketing data. According to an embodiment of the present invention, the mobile software platform includes an application implemented on a mobile device that interacts with a system database. The application thereby provides a system for managing sales and marketing data generated by sales prospecting, such as from cold calls, mailings, e-mails, door-to-door sales, and/or any other communication with customers or potential customers. The mobile application is configured to display several screens in response to gesture commands from a system user, and is navigated by user touch. The mobile application thus enables users to input and retrieve sales data from the system database with their mobile devices without regard to their location.

Figure 1:
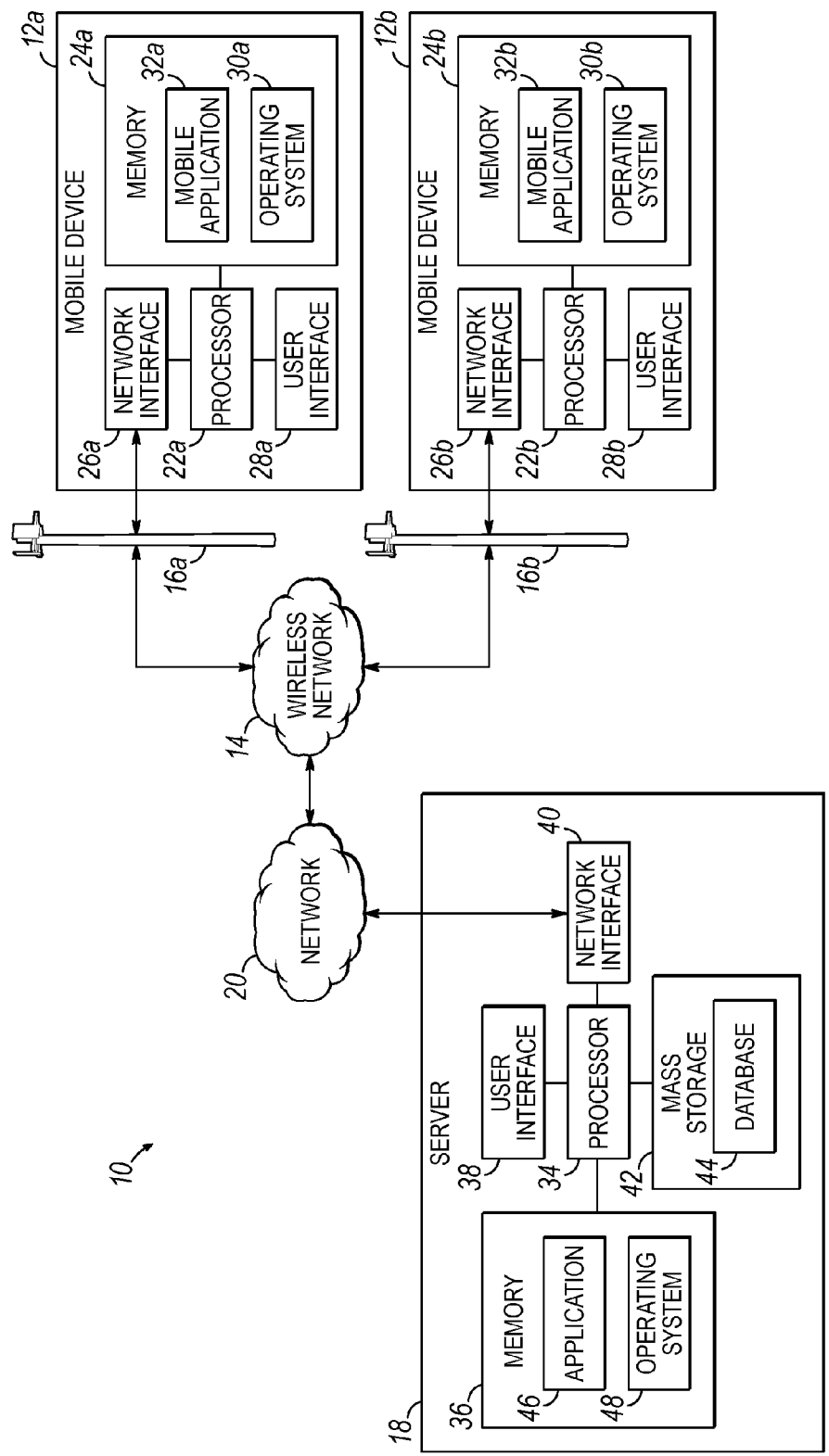
FIG. 1 is a schematic view of a mobile sales tracking system including a plurality of mobile devices.

Referring now to FIG. 1, a mobile sales tracking system 10 in accordance with an embodiment of the present invention includes a plurality of mobile devices 12a, 12b in communication with a wireless network 14 via one or more access points 16a, 16b. Although FIG. 1 shows two mobile devices 12a, 12b, persons having ordinary skill in the art will understand that any number of mobile devices 12a, 12b may be used, and embodiments of the invention are not limited to a particular number of mobile devices 12a, 12b. Each access point 16a, 16b may be a cellular base transceiver station (BTS), a WiFi access point, or any other suitable wireless communication access point. The wireless network 14 is in communication with a server 18 via a network 20, which may include one or more data networks, such as a Local Access Network (LAN), a Wide Access Network (WAN), and/or a public network, such as the Internet.

The mobile devices 12a, 12b may be smart phones or any other suitable mobile device, such as a tablet or laptop computer. Each mobile device 12a, 12b includes a processor 22a, 22b, a memory 24a, 24b, a network interface 26a, 26b, and a user interface 28a, 28b. The processor 22a, 22b may include one or more processors selected from microprocessors, micro-controllers, digital signal processors, microcomputers, central processing units, field programmable gate arrays, programmable logic devices, state machines, logic circuits, and/or any other devices that manipulate signals (analog and/or digital) based on operational instructions that are stored in memory 24a, 24b. Memory 24a, 24b is operatively coupled to the processor 22a, 22b, and may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing data.

Processor 22a, 22b may operate under the control of an operating system 30a, 30b that resides in memory 24a, 24b. When present, the operating system 30a, 30b manages mobile device resources so that program code embodied as a mobile application 32a, 32b residing in memory 24a, 24b may have instructions executed by the processor 22a, 22b. In an alternative embodiment, the mobile application 32a, 32b may be executed by the processor 22a, 22b directly, in which case the operating system 30a, 30b may be omitted.

The user interface 28a, 28b is operatively coupled to the processor 22a, 22b of mobile device 12a, 12b and includes at least one output device and one input device. Suitable output devices for the mobile device 12a, 12b include, but are not limited to, a touch screen, an alphanumeric display, an audio transducer, and/or any other visual, audible, and/or tactile indicator. Likewise, suitable input and/or control devices include, but are not limited to, the aforementioned touch screen, an alphanumeric keyboard or keypad, a pointing device, pushbuttons, a microphone, and/or any other device capable of accepting commands or input from the user and transmitting the entered input to the processor 22a, 22b. The user interface 28a, 28b may also include an imaging device, or camera (not shown) configured to capture images representative of the surrounding environment. The captured images may be processed into any suitable digital image file format known in the art, such as a raw image file, bit map, Joint Photographic Experts Group (JPEG) formatted image (to name but a few) by the processor and stored in memory 24a, 24b or transmitted to another device via the network interface 26a, 26b. The user interface 28a, 28b thereby provides a mechanism whereby a user may input data to, and receive data from the processor 22a, 22b, including image data.

Each mobile device 12a, 12b may be connected, or attached, to the wireless network 14 via the wireless access point 16a, 16b. The connection may be formed automatically when the mobile device 12a, 12b comes within range of the wireless access point 16a, 16b, or the connection may be initiated by an input from the mobile device user via the user interface 28a, 28b. The wireless access point 16a, 16b may be a Wi-Fi access point connected directly or indirectly to the wireless network 14, or the wireless access point 16a, 16b may be a BTS that is part of a wireless service provider network using WiMax, GPRS, EDGE, 1xRTT, EV-DO, UMTS, or any other suitable wireless protocol to connect to the wireless network 14. The network interface 26a, 26b includes a transceiver (not shown) that provides a communication link with the wireless access point 16a, 16b using a wireless communication protocol such as IEEE 802.11 (WiFi), WiMax, GPRS, EDGE, 1xRTT, EV-DO, UMTS, or any other suitable wireless protocol.

Similarly as described with respect to the mobile device 12a, 12b, the server 18 includes one or more processors 34, a memory 36, a user interface 38, and a network interface 40. The server 18 may also include a mass storage device 42, which may be a single mass storage device or a plurality of mass storage devices including but not limited to hard drives, optical drives, tape drives, non-volatile solid state devices and/or any other device capable of storing digital information. A system database 44 resident in mass storage device 42 may include data relating to sales and marketing that is accessible by the mobile applications 32a, 32b and a database application 46 resident in memory 36. The network interface 40 of server 18 provides a communication link between the processor 34 and the network 20 using a suitable network communication protocol, such as Transmission Control Protocol/Internet Protocol (TCP/IP) over Ethernet that allows the mobile applications 32a, 32b to communicate with the system database 44 and database application 46.

The processor 34 of server 18 typically operates under the control of an operating system 48 that resides in memory 36 and executes program code embodied as the database application 46 residing in memory 36. The database application 46 may comprise a plurality of applications or sub-routines, such as database applications, web server applications, shell programs, and a graphic user and/or machine-machine interface program for interfacing with system users. The database application 46 may access the system database 44 to provide data to and store data from the mobile applications 32a, 32b in response to queries received from the mobile applications 32a, 32b.

The database application 46 may be configured to work cooperatively with other applications, such as the mobile applications 32a, 32b, to provide the features of the mobile sales tracking system 10. To this end, the mobile and database applications 32a, 32b, 46 may each have program code that is executed in one of the other processors 22a, 22b, 34, or may otherwise rely on functions and/or signals provided by other hardware platforms. Indeed, given the nearly endless hardware and software configurations possible, persons having ordinary skill in the art will understand that embodiments of the invention may include applications or program code that is located and executed externally to the mobile sales tracking system 10, distributed among the mobile devices 12a, 12b and/or server 18, or integrated into additional hardware platforms and software applications not shown in FIG. 1 that are in communication with the applications 32a, 32b, 46 via the networks 14, 20.

Figures 2, 3:
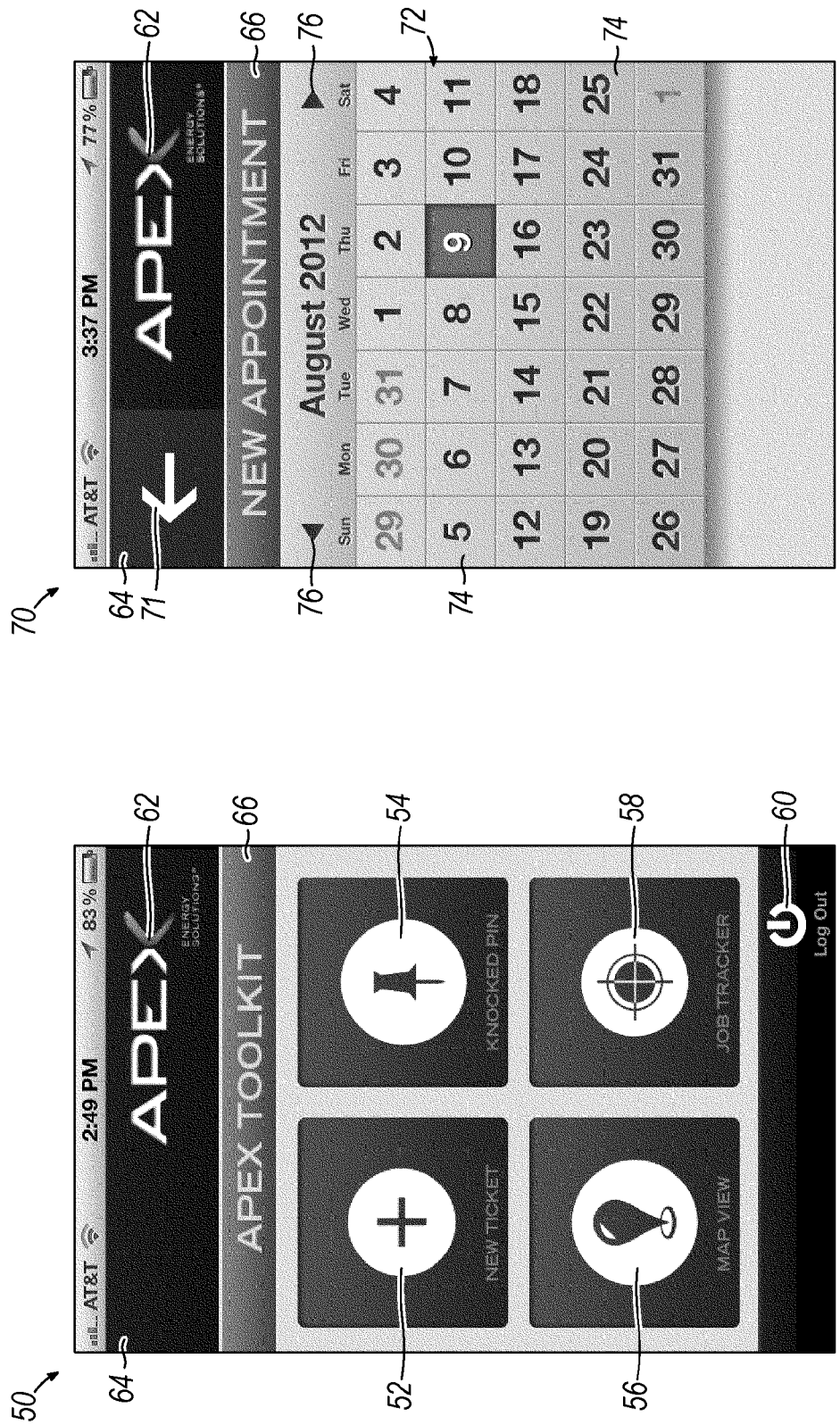
FIG. 2 is a diagrammatic view of a screen displayed by a mobile device of FIG. 1.
FIG. 3 is a diagrammatic view of a screen displayed by the mobile device of FIG. 2 in response to activation of a new ticket icon.

Referring now to FIG. 2, the mobile application 32a, 32b may display a home screen 50 on the user interface 28a, 28b of mobile device 12a, 12b. The home screen 50 may be the first screen encountered by a system user, and provides an entry point into the sales tracking system 10. To this end, in an embodiment of the present invention, the home screen 50 may include a new ticket icon 52 that is associated with creating a new ticket, a knocked pin icon 54 that is associated with a visited address, a map view icon 56 that is associated with a map that displays sales and marketing data in the form of icons, a job tracker icon 58 associated with a screen that provides information regarding a sold product or job in progress, and a log out button 60. It will be appreciated, however, that one or more of the icons 52, 54, 56, 58, and 60 may be provided on one or more different screens other than the home screen 50. Embodiments of the invention are therefore not limited to a home screen 50 that includes the aforementioned icons 52, 54, 56, 58, and 60. From the home screen 50, the system user can begin any workflow or have access to any part of the mobile sales tracking system 10.

In an embodiment of the present invention, the user's login ID will dynamically load into a logo 62 located in a header section 64 based on data in a file stored in the memory 24a, 24b of mobile device 12a, 12b. The system 10 may also select or load an appropriate color scheme on the page title bar 66 based on the user ID. The color scheme and/or home page configuration may be determined by the database application 46 using a lookup table or other suitable method that selects a user interface template associated with the user in question. The user experience may thereby be selectively tailored to a specific sales team of which the user is a part. The database application 46 may thereby be configured to serve multiple customers, with each customer having their own custom home screen 50. For the purposes of explaining embodiments of the invention herein, the exemplary home screen 50, as well as all following screens, are shown as being configured for "Apex Energy Solutions."

When a user first logs into the sales tracking system 10 according to one embodiment, the user will arrive at the home screen 50. The home screen 50 is thus the starting place for the tools associated with the sales tracking system 10. From the home screen 50, a user may create a new sales appointment, create a new knocked pin, look up a street address to see if any sales and/or marketing information is associated with the street address in the system database 44, view a map of all sales contacts in the user's area, or track and manage all job content.

To create a new appointment, the user may activate the new ticket icon 52. Creating a new appointment means that a sales associate has been provided with a sales lead in the form of an appointment to meet a potential customer at a specific time. In one embodiment, a system user may be a marketing representative conducting "door-to-door" sales, cold calling prospective customers, or otherwise generating sales leads through customer contact. This marketing representative may begin the process of creating a new appointment for a sales associate by touching the new ticket icon 52 on the home screen 50. For example, if a homeowner answering the door expresses an interest in a product, the marketing representative may schedule an appointment for a sales associate to come out and meet with the homeowner.

Referring now to FIG. 3, in response to activation of the new ticket icon 52, the mobile application 32a, 32b may display a calendar view screen 70 that also includes the logo 62, header section 64, and title bar 66 of home screen 50. A reverse button 71 in header section 64 provides a means for the user to return to the previous screen, which in this case is the home screen 50. The calendar view screen 70 also includes a calendar 72 having day buttons 74, and forward and reverse arrows 76 that may be used to advance or reverse the calendar 72 a month at a time. To set a new appointment for a sales associate, the system user may simply activate the day button 74 corresponding to the desired day, such as by touching the day button 74 as it is displayed on a touch screen provided by the user interface 28a, 28b of mobile device 12a, 12b.

Figures 4, 5:
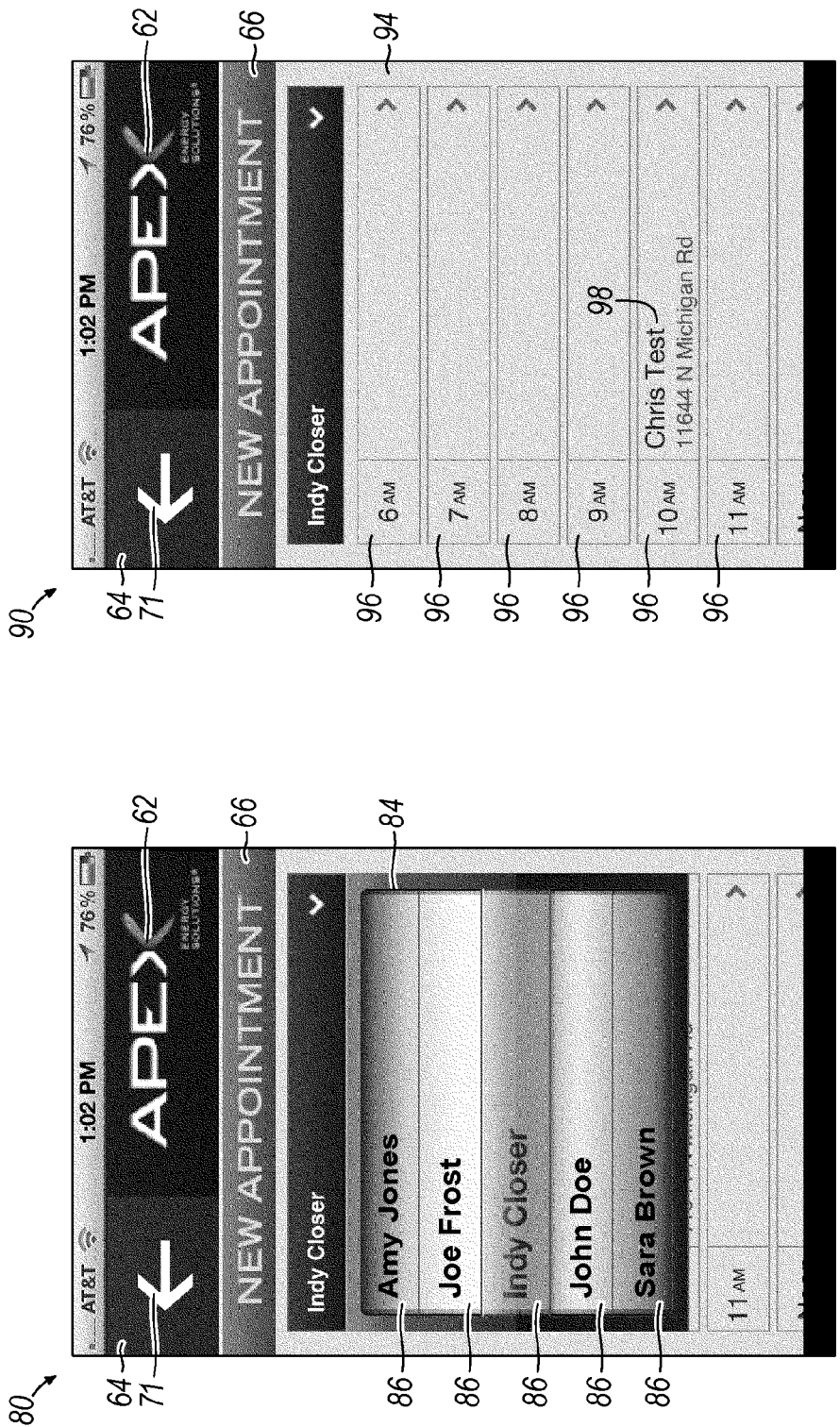
FIG. 4 is a diagrammatic view of a screen displayed by the mobile device of FIG. 3 in response to activation of day button.
FIG. 5 is a diagrammatic view of a screen displayed by the mobile device of FIG. 4 in response to activation of a sales associate button.

Referring now to FIG. 4, in response to the marketing representative activating the day button 74, the mobile application 32a, 32b may display a new appointment screen 80. The new appointment screen 80 may include an available associate window 84 that displays a list of available sales associates in the form of one or more sales associate buttons 86. The system user can then select an available sales associate for whom they wish to set an appointment via the user interface 28a, 28b of mobile device 12a, 12b. For example, the system user may use a gesture based inertia scroll wheel to "roll-through" the sales associate buttons 86 on the touch screen until the desired button 86 is displayed. The system user may then activate the desired sales associate button 86 by touching the button 86. In an embodiment of the present invention, each sales associate may be assigned to particular marketing representatives in the system database 44. So that the marketing representative is only provided with the option of selecting a sales associate that has been assigned to them by a system administrator, the mobile application 32a, 32b may query the database application 46, or the system database 44 directly, to determine which sales associate buttons to display prior to displaying the new appointment screen 80.

Referring now to FIG. 5, in response to activating the sales associate button 86, the mobile application 32a, 32b may display a day planner screen 90 for that associate. The day planner screen 90 includes a day schedule window 94 for the selected sales associate that includes a plurality of time blocks 96, some of which may list appointments 98 that have been previously scheduled for that associate by this or another system user. So that the day schedule window 94 has current information, the mobile application 32a, 32b may query the database application 46 to obtain the latest appointment data for that sales associate from the system database 44 prior to displaying the window 94. The system user is thereby informed in real time of the associate's availability on the selected day.

Advantageously, by locating the associate availability information in the system database 44, and making this information accessible from the wireless devices 12a, 12b, the sales tracking system 10 enables marketing representatives to schedule associates without creating conflicts. The calendar feature thereby provides the marketing representative with all available times for the selected sales associate. The sales tracking system 10 thus eliminates any chance of creating an appointment where the sales associate is not available, even if multiple marketing representatives are simultaneously canvassing separate geographic regions and scheduling appointments.

To create an appointment, the system user selects an available time block 96, for example, by scrolling to the desired time and touching the time block 96 as previously described. Once the system user selects an available time and enters the resident's name and address for the appointment, the information is transmitted to the database application 46 by the mobile application 32a, 32b to update the system database 44. The appointment will now appear on the day planner screen 90 of that sales associate for all system users. Because all appointments for all sales associates are tracked by the database application 46, marketing representatives never have to worry about setting an appointment for a time when the sales associate is not available.

In the event the marketing representative encounters difficulty in contacting a resident of an address, the sales tracking system 10 provides a knocked pin feature to track customer contact or attempted contact. For example, if the marketing representative "knocks on the door" of a residence, but the homeowner is either not home, or does not have time to talk in detail, the representative may create a knocked pin ticket by activating the knocked pin icon 54 on the home screen 50. The marketing representative may create knocked pin tickets for each home where contact was not made to keep track of their progress through a neighborhood. A knocked pin ticket may also be created to track the outcome of a cold call, mailing, or e-mail to a prospective customer.

The knocked pin feature thereby allows the representative, as well as other members of the sales team, to generate valuable marketing data by tracking where the representative has been, who they have contacted, and by keeping track of leads the sale team may wish to revisit. The knocked pin may also be displayed on a map, as will be described in more detail below. This marketing data may be stored on the mobile device 12a, 12b until the data can be uploaded to the system database 44 so that the data is available to all authorized system users. Typically, the knocked pin data will be synched between the mobile devices 12a, 12b and the system database 44 so that each marketing representative has up-to-date marketing information regarding the neighborhood being canvassed. The knocked pin feature thus provides a tool that allows users to track all potential leads and prospects that have been "touched" by the sales team.

Figures 6, 7:
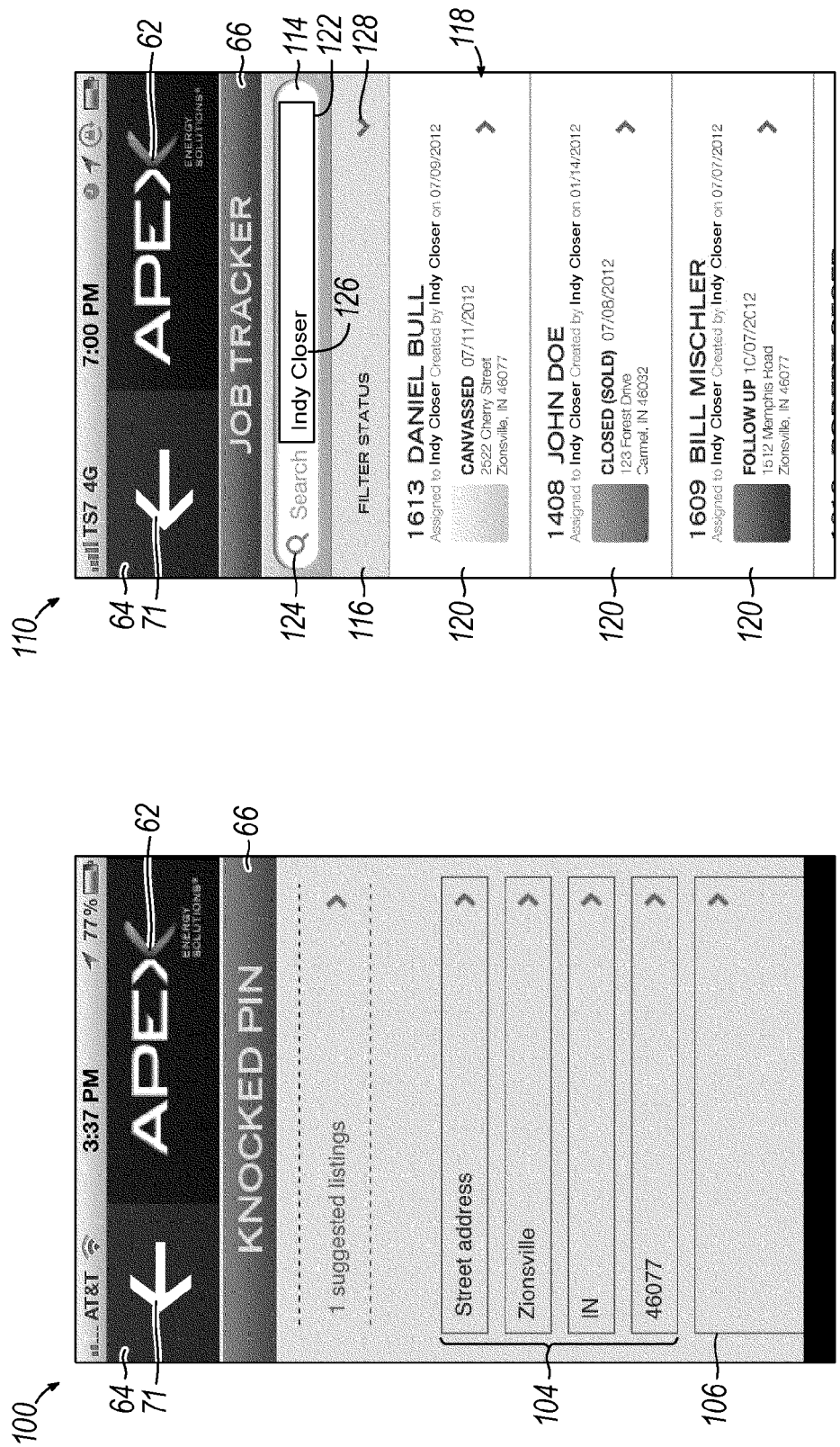
FIG. 6 is a diagrammatic view of a screen displayed by the mobile device of FIG. 2 in response to activation of a knocked pin icon.
FIG. 7 is a diagrammatic view of a screen displayed by the mobile device of FIG. 2 in response to activation of a job tracker icon by a sales associate.

Referring now to FIG. 6, the knocked pin tool is accessed from the home screen 50 by activating the knocked pin icon 54, such as by touching the touch screen of the mobile device 12a, 12b. In response to activating the knocked pin icon 54, the mobile application 32a, 32b may display a knocked ticket screen 100. The knocked ticket screen 100 includes an address field 104 and a notes field 106 that provides the system user with the ability to enter the address of a visited home, and add any notes about that home (i.e. come back later, home for sale, etc). In an embodiment of the present invention, the address field 104 may be populated automatically based on the location of the mobile device 12a, 12b as determined by information from a geo-location feature (e.g., using a Global Positioning System feature) in the mobile device 12a, 12b.

The system user may add notes in the notes field 106 to indicate why they thought the home was a good lead, etc. while the system user's thoughts are fresh. In addition to the notes field 106 shown in the illustrated embodiment, the system administrator may define other fields to be displayed on the knocked ticket screen 100. These additional fields may be for entering in any data desired by the sales team. For example, fields may be included that: prompt the system user to enter data concerning products that should be promoted to the homeowner (e.g., windows if the house is old and has original windows); provide the sales team with an indication of the customer interest level in one or more products; lists of current sales campaigns or promotions that should be offered to the customer; or any other data that is identified as desirable marketing data by the sales team. Persons having ordinary skill in the art will therefore understand that embodiments of the invention are not limited to knocked ticket screens having any particular set of data entry fields. The sales tracking system 10 thereby provides a customizable, versatile, and useful tool for generating high quality marketing data for the sales team. Based on the information entered into the knocked ticket, a marketing representative may decide to re-visit a home in the future. The sales team may also target the address with information tailored to be of interest to that homeowner, such as through direct mail to the address entered in the knock ticket. If the homeowner is home the next time a marketing representative visits, the marketing representative may use suggested listings in the new appointment tool to merge the old knocked pin ticket data with a new canvassed ticket.

In addition to populating address fields of the knock ticket, the mobile application 32a, 32b may track a user's location automatically using the geo-location feature of the mobile device 12a, 12b. This location information may be uploaded to the system database 44, and combined with marketing information in the knocked pin tickets and sales leads generated by the marketing representatives to generate a database of all the homes knocked, sold, installed, or that have pending installations that is searchable by location. The mobile application 32a, 32b may, in turn, query the system database 44 for marketing information on all homes within a selected radius of the mobile device 12 based on the location of the mobile device 12*a*, 12*b*.

At times, a system user may wish to determine the status of a sale. For example, a project manager or sales associate may wish to determine if a sold product has been installed, or otherwise determine the status of a job. To satisfy this need, the sales tracking system 10 provides the job tracker icon 58 on the home screen 50.

Figures 8, 9:
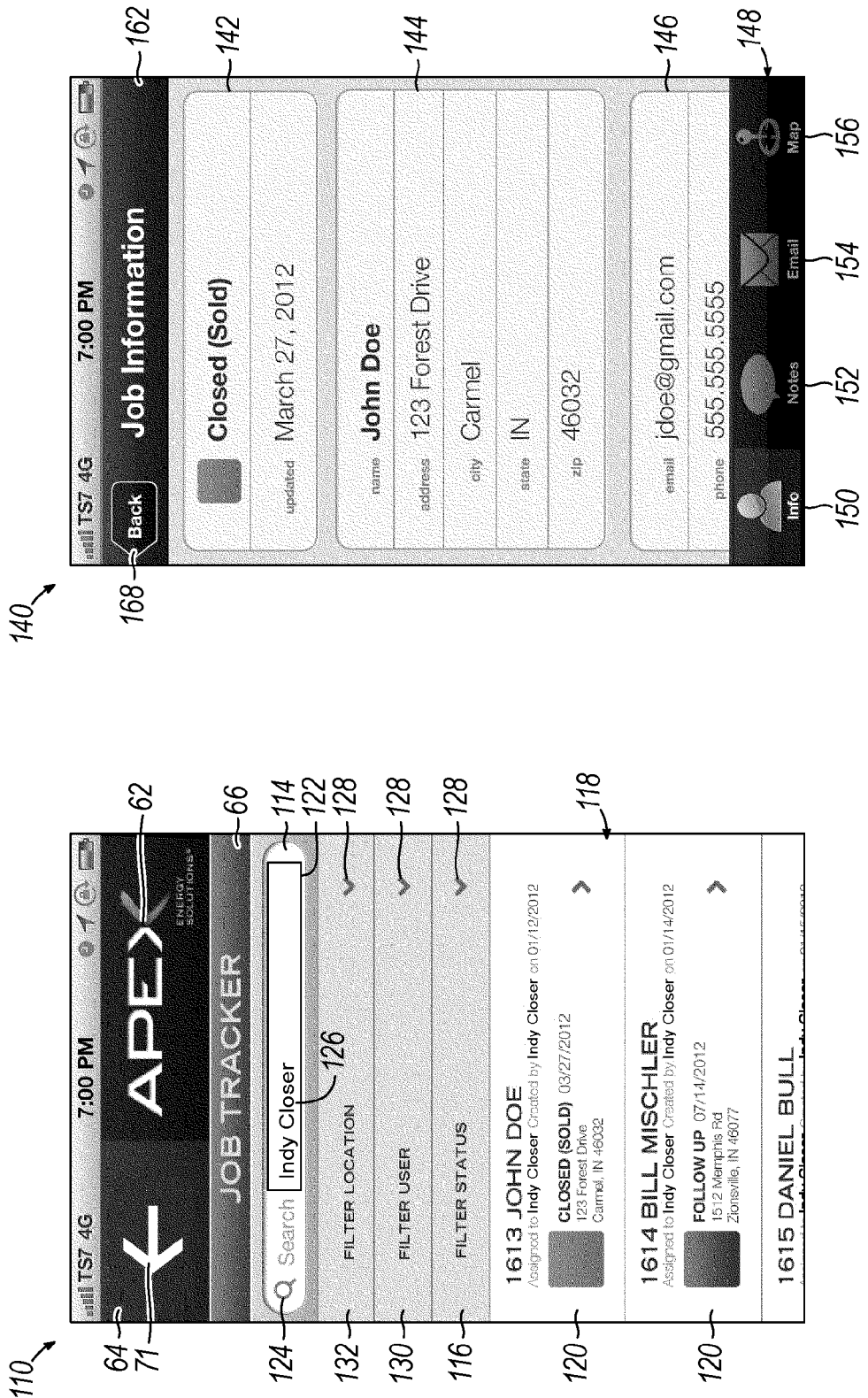
FIG. 8 is a diagrammatic view of a screen displayed by the mobile device of FIG. 2 in response to activation of a job tracker icon by a system administrator.
FIG. 9 is a diagrammatic view of a screen displayed by the mobile device of FIG. 7 or 8 in response to selection of a job selection button.

Referring now to FIGS. 7 and 8, in response to the system user selecting the job tracker icon 58, the mobile application 32*a*, 32*b* may display a job tracker screen 110 including one or more data fields. The data fields displayed by the job tracker screen 110 may depend on the status of the system user activating the job tracker icon 58. For example, a sales associate may be presented with the job tracker screen 110 illustrated in FIG. 7, while a system administrator may be presented with the job tracker screen 110 illustrated in FIG. 8. In either case, the job tracker screen 110 data fields may include a search window 114, a filter status field 116 that provides a filtering feature, and a jobs window 118 that includes one or more job data fields 120 based on data in the system database 44. In an embodiment of the present invention, the job data fields 120 shown in the jobs window 118 may be selected based on search terms entered into the search window 114.

To this end, the search window 114 includes a search term entry field 122 and a search button 124 that allows the system user to search for jobs based on entered search terms 126. For example, the system user may enter the name of a particular sales associate (e.g., "Indy Closer"), a product being sold, or a street name into the search window 114. In response to the entered search terms, the job data fields 120 displayed in the jobs window 118 by the mobile application 32*a*, 32*b* may be confined to those that include the search terms. This selection process may occur as the search terms are entered into the entry field 122, or may be implemented in response to activation of the search button 124. In either case, the system user can thereby track jobs based on, for example, the region for those jobs, or a sales associate or marketing representative associated with the job.

In addition to the search function, system users may filter the jobs displayed by their status, such as canvassed, sold, pending install, installation complete, payment outstanding, etc. using the filter status feature. In an embodiment of the present invention, the filter status feature may be activated by the system user clicking on or touching an activation button 128, which may cause the mobile application 32*a*, 32*b* to display a pull down menu (not shown). The pull down menu may include filter terms (e.g., canvassed, sold, pending install, installation complete, payment outstanding) that allows the system user to filter the job data fields 120 displayed in the jobs window 118. The filter features available to the system user may be based on the user's login and access level. In the case of the system administrator, the job tracker screen 110 may include additional filter fields that enable filtering by the user 130 or location 132 listed in the job ticket, as shown in FIG. 8.

To obtain more information about a particular job, the system user may simply touch the job data field 120 to pull up more information. This information may include location data in the form of a symbol, such as a pin, on a map that shows the job location, when the marketing representative set the initial appointment with the sales associate, when the job was sold, etc. For example, referring now to FIG. 9, touching a job data field 120 displayed in the jobs window 118 of FIG. 8 may cause the mobile application 32*a*, 32*b* to display a job information window 140. The job information window 140 may include, for example, a status field 142, a name and address field 144, and a customer contact information field 146. A job navigator bar 148 may also be displayed in the job information window 140, and may include buttons for selecting what information to display or for initiating contact with the customer. For example, the job navigator bar 148 may include a general information button 150, a notes button 152, a send e-mail button 154, and a map view button 156. The mobile application 32*a*, 32*b* may display the general information, or job information home screen 140 in response to activation of the information button 150; a job notes screen 160 (FIG. 10) in response to activation of the notes button 152; an e-mail generation window 201 (FIG. 13) in response to activation of the e-mail button 154; or a map view showing the location of the job on a map in response to activation of the map view button 156. Each job data field 120 may also include an automatically generated identification number, or ticket ID number (not shown) that uniquely identifies the job.

Figures 10, 11:
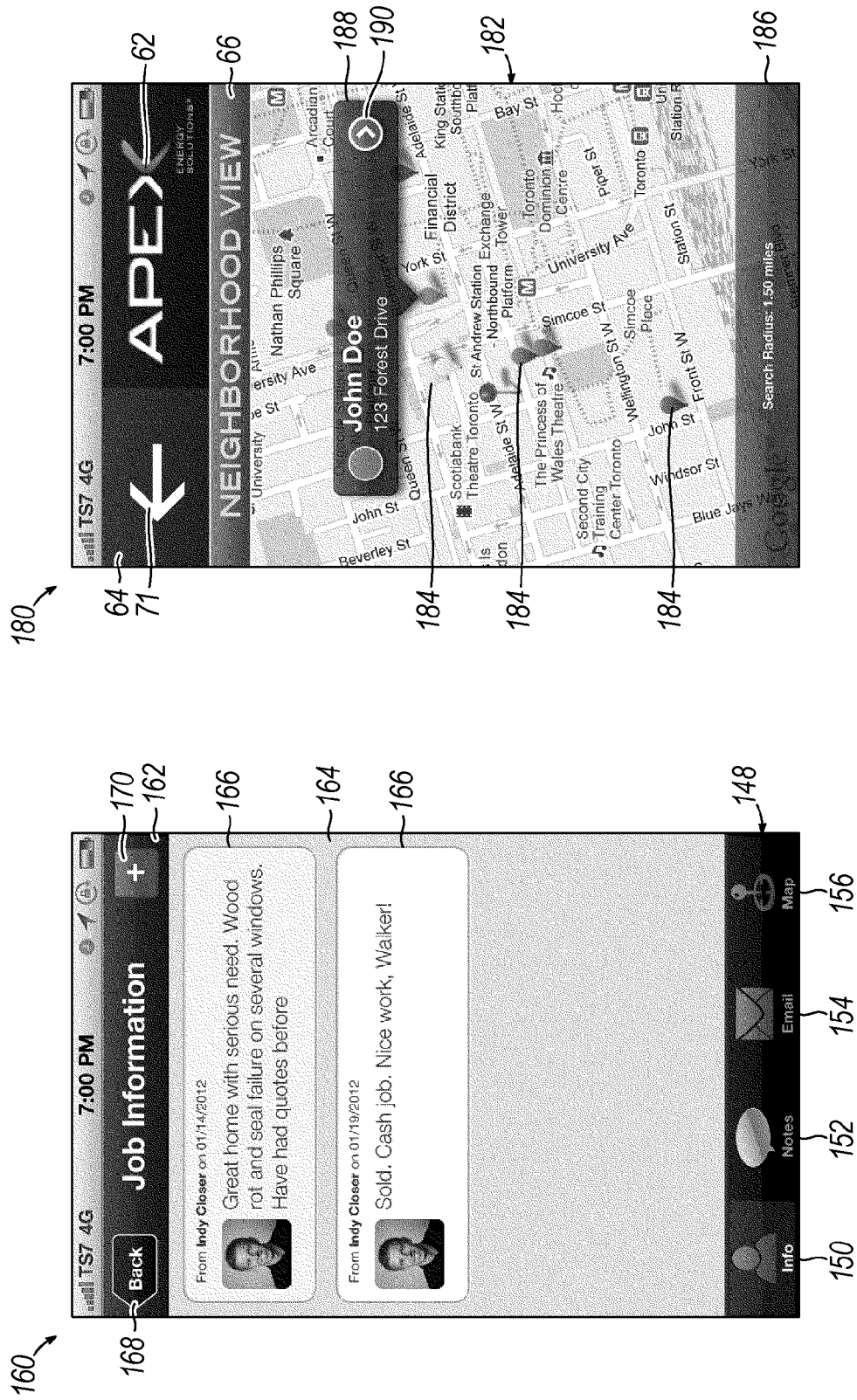
FIG. 10 is a diagrammatic view of a job notes screen displayed by the mobile device of FIG. 9 in response to activation of a job notes button.
FIG. 11 is a diagrammatic view of a neighborhood view screen displayed by the mobile device of FIG. 2 in response to activation of map view icon.

Referring now to FIG. 10, in response to activation of the notes button 152 in FIG. 9, the mobile application 32*a*, 32*b* may display the jobs notes screen 160. The jobs notes screen 160 may include the job navigator bar 148, a notes screen header 162, and a notes window 164 that contains job notes 166 entered by system users. The notes screen header 162 may include a back button 168 that returns the user to a previously viewed screen and an "add job note" button 170. In response to the system user activating the add job note button 170, the mobile application 32*a*, 32*b* may allow the system user to enter information regarding the job in question through the user interface 28*a*, 28*b* of mobile device 12*a*, 12*b*.

The job tracker feature thereby allows anyone authorized by the system administrator to track the status of any job associated with their sales team or company, as well as update and manage all job related content. The job tracker feature thereby allows marketing representatives to see if their leads have turned into sales, and allows sales associates to track when their sold jobs are installed and completed. This tracking may all be performed from the mobile device 12*a*, 12*b* to provide data current with the system database 44. The job tracker feature also allows management to track business metrics such as leads in the sales pipeline, closing ratios of the associates, and jobs in the installation pipeline. All of these metrics are time sensitive and often need to be accessed while in the field, such as at a job site. The sales tracking system 10 thereby greatly enhances management's ability to make decisions and run their business efficiently, particularly when away from the office. The job tracker feature is thus a mechanism that provides complete transparency into the entire sales process for all sales team members, as well as providing complete accountability for every potential customer.

All customer data may be edited based on user login and access level. Users with a lower access level (e.g., a marketing representative) may only be able to edit or manage homeowner contact information, whereas users with a higher access level (e.g., a sales associate) may also be able to edit appointment times and dates, sales amounts, etc. Administration level users may be allowed to reassign users and have total access to the system database 44 to edit all ticket details. In addition to tracking all installation data, the job tracker feature may enable marketing representatives, sales associates, installers, and/or accountants to enter notes about a job so that these notes are available to the rest of the sales team. These notes may be separate from the notes entered via the knocked ticket feature to allow control over which employees and/or contractors are able to see the entire history of the job. For example, marketing information contained in a knocked ticket may be made unavailable to a contractor performing an installation to keep knocked ticket information away from competing firms that may share contractors. FIG. 10 illustrates an example of an embodiment of the "notes" function in the job tracker. These notes provide a reliable way of communicating information regarding the job throughout the sales cycle. All notes are stored in the system database 44 and associated to the unique job ID. These notes may also be sent via e-mail to users assigned to a particular ticket. This ensures all updates to jobs are thoroughly communicated throughout the sales team.

Referring now to FIG. 11, the sales and marketing data maintained in the system database 44 may also be searched or accessed based on geographic location using a mapping feature. The mapping feature may be accessed by activating the map view icon 56 of home screen 50, or the map view button 156 of the job navigation bar, as the case may be. In response to activation of the mapping feature, the mobile application 32a, 32b may generate and display a neighborhood view screen 180 that includes a map 182 having one or more symbols, such as push pins 184. The push pins 184 may represent addresses that are associated with sales and marketing data in the system database 44, and may represent knocked pins and/or job tracker pins. The radius searched by the mobile application 32a, 32b may be adjusted base on the scale of the map 182, and displayed in a searched radius window 186. That is, the search radius may be determined so that the area searched is approximately the same as that displayed by the map. Thus, in response to a system user pinching out to reveal a broader area (i.e., a larger search radius), the mobile application 32a, 32b may query the database application 46 for additional sales and marketing data regarding addresses within the new radius. Any new addresses associated with marketing data in the system database 44 may then be displayed as a push pin 184 or other symbol on the new map 182.

Likewise, the system user may pinch in on a particular area to see the addresses having marketing data for that area. A preselected color of the push pin 184, or other suitable graphical indicia, may be used to denote the status of that address. For example, the color of the pin may indicate that the address represents a residence that has been knocked, sold a product, has a pending installation, has an installed product, is a home to be avoided (e.g., a "no knock" home), or any other characteristic of the home the sales team determines is useful to the marketing representatives.

To view the data associated with the address, the system user may select one of the pins 184 by, for example, touching or tapping on the pin 184. In response to selecting the push pin 184, a pop-up window 188 may be displayed that includes information associated with the pin 184, such as a name and address. To obtain more information regarding the address represented by the pin, the system user may touch a retrieve information button 190 in the pop-up window 188. In response to the system user activating the retrieve information button 190, the system user may be taken to the knocked ticket screen 100 in the case of a knocked pin, the job information screen 140 in the case of a job tracking pin, or provided with a choice of screens to be displayed, as the case may be. The system user may thereby obtain additional notes regarding that particular address entered by a marketing representative, sales associate, installer, or any other system user.

Referring now to FIG. 12, in response to selecting the retrieve information button 190, the mobile application 32a, 32b may display a ticket details screen 200 that provides more detailed information about jobs, sales leads, and/or other sales and marketing information associated with the address represented by the push pin 184. The ticket details screen 200 may include a status field 202 that provides the latest information regarding any pending sales or jobs associated with the address, a notes field 204 that includes information entered by a system user or comments from a customer survey, a directions button 206, and one or more link buttons 208. The link buttons 208 may provide the system user with links to other data that may be associated with the address, such as provided by the knocked ticket screen 100, and/or job tracker screen 110 (shown). The ticket details screen 200 thereby provides the system user with extended notes, survey comments and the most recent data on a particular ticket. Additionally, the system user may get directions directly to the address or view the ticket in the job tracker for all job content by activating the directions button 206.

In response to certain actions, the sales tracking system 10 may automatically generate communications to the customer. For example, in response to a marketing representative creating a new appointment, as described above with respect to FIGS. 3-5, an e-mail may be automatically generated and sent by the sales tracking system 10. This e-mail, referred to herein as a dynamic e-mail, utilizes dynamic content provided by the database application 46 to populate the dynamic e-mail. The dynamic e-mail may, for example, be generated by the database application 46 to inform the customer of an appointment with a sales associate. Because the database application 46 knows the identity of the sales associate who is going to run the sales appointment, the application 46 may attach a picture, name, title and contact information of that sales associate to the dynamic e-mail. In this way, the dynamic e-mail may serve as a "security ID letter" that allows the customer to positively identify the sales associate.

In addition to the picture, the database application 46 may also attach an image of a hand signature of the sales associate. The dynamic e-mail to the customer may be automatically generated in response to creation of a new appointment, and may automatically include the picture and signature of the sales associate assigned to the appointment. If, for some reason, the appointment needs to be rescheduled by the sales associate, the system 10 may also generate and send a reschedule letter to the customer's e-mail address notifying them of the reschedule.

The sales tracking system 10 may also be configured to automatically generate other types of dynamic e-mails. For example, the system 10 may generate a "thank you" e-mail that is used as a means of follow-up to the customer after an appointment has run. The system 10 may also be configured to generate a "reconsider" e-mail that is used to follow up on cancelled appointments, or appointments that don't ultimately produce a sale, in hopes of persuading the customer to reconsider the offer. These dynamic e-mails may employ the same dynamic content features as the "security ID letter" e-mail, so that information in the e-mails is up-to-date with the current status of the customer.

These automatically generated dynamic e-mails may be populated with custom letterheads, signature fields, customer and sales associate names, artwork, and/or any other information included in the system database 44. In this way, each e-mail may have a customized look and feel that includes current information on the customer, products being offered, and the sales associate assigned to the sales lead. Because the dynamic e-mail is generated automatically by simply activating a button on a screen, the system user is not required to expend significant amounts of time and energy drafting correspondence. System users may thus be encouraged to have more interaction with potential customers. At the same time, the custom feel provided to the e-mails by automatically populating the e-mail with dynamic data from the database may increase customer response rates.

By way of example, and referring now to FIG. 13, in response to activating the e-mail button 154 of job navigation bar 148, the mobile application 32a, 32b may display an e-mail generation window 210. The e-mail generation window 210 may include a plurality of buttons, each associated with a particular type of e-mail to be generated. In the exemplary embodiment shown in FIG. 13, the e-mail generation window 210 includes a send "thank-you" e-mail button 212, a send "reconsider" e-mail button 214, and a send custom e-mail button 216. In response to activation of the "thank-you" or "reconsider" e-mail buttons 212, 214, the mobile application 32a, 32b or database application 46 may generate an e-mail based on data in the system database 44 regarding the customer in question. In response to activating the send custom e-mail button 216, the system user may be provided with a window in which to compose an original e-mail to send to the customer's e-mail address.

In an embodiment of the present invention, the sales tracking system and all of the system processes are focused around the database application 46, which is part of a database backend system. The database application 46 may be accessible via any web browser so that mobile devices 12a, 12b and other computers may access the application 46 through an internet browser. In this embodiment, all administrative tools such as creating new users, setting up new accounts, uploading custom content, etc is done via the database application 46. In addition, users may be provided with database application support and training material directly from this portal.

The database application 46 may also display many of the tools found within the mobile application 32a, 32b. For example, all jobs in the job tracker may be managed and updated by users via the database application 46. The same automated follow-up processes (security ID letter e-mail, appointment reminders, etc.) may be fulfilled using database application tools similar as those found on the mobile application 32a, 32b.

In addition, user analytics may be displayed via a widget or section of the database application 46. These analytics can range from how many jobs are in the pipeline, how many jobs are in pending status, year-to-date sales, top performing markets, etc. The database application 46 may also display a variety of other data in this section. Anything captured and stored in the system database 44 may be called up and displayed for the user. The database application 46 may also allow the system administrator to limit what data is visible to a user based on their access level.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of applicant's invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

As used herein, the term "in response to" means "in reaction to" and/or "after" a first event. Thus, a second event occurring "in response to" a first event may occur immediately after the first event, or may include a time lag that occur between the first event and the second event. In addition, the second event may be caused by the first event, or may merely occur after the first event without any causal connection.

The invention claimed is:

1. A method of managing sales and marketing information comprising:
   displaying a first screen on a first user interface of a first mobile device, the first screen including a first icon;
   in response to activation of the first icon, displaying a second screen on the first user interface, the second screen including an address field and a notes field;
   receiving address data in the address field;
   receiving notes data in the notes field;
   creating a database file in a system database, the database file being associated with a first location defined by the address data in the address field and containing the address data and the notes data;
   receiving a query at the system database from a second mobile device that includes a second user interface, the query defining a second location;
   in response to the second location being within a search radius of the first location, displaying, on the second user interface, a symbol that indicates the first location on a map; and
   in response to activation of the symbol, displaying, on the second user interface, at least a portion of the notes data in the database file.

2. The method of claim 1 wherein receiving the address data in the address field includes:
   obtaining location data from a geo-location feature in the first mobile device; and
   populating the address field with the address data based on the location data.

3. The method of claim 1 further comprising:
   displaying a second icon on the second user interface;
   wherein the map is displayed in response to activation of the second icon, and the symbol is one of a plurality of symbols indicating locations on the map of addresses associated with a plurality of database files in the system database; and
   in response to activation of one of the symbols displayed on the map, displaying at least the portion of the data in the database file associated with the activated symbol.

4. The method of claim 3 further comprising:
   obtaining location data from a geo-location feature in the second mobile device;
   determining the second location of the second mobile device based on the location data;
   centering the map on the second location;
   determining the search radius centered on the second location, the search radius corresponding to a scale of the map;
   generating symbols indicating the locations for any database files associated with an address located within the search radius; and
   displaying the generated symbols on the map.

5. The method of claim 4 further comprising:
   rescaling the map; and
   in response to rescaling the map, changing the search radius.

6. The method of claim 1 further comprising:
displaying a third screen on the second user interface, the third screen including a second icon; and
in response to activation of the second icon, displaying a fourth screen that includes one or more job data fields.

7. The method of claim 6 further comprising:
determining a status of a system user, wherein
the one or more job data fields comprises a first set of data fields if the system user has a first status level; and
the one or more job data fields comprises a second set of data fields if the system user has a second status level.

8. The method of claim 6 further comprising:
in response to selecting one of the one or more job data fields, displaying a job information window that includes information about a job associated with the selected job data field.

9. The method of claim 8 wherein the symbol is one of one or more symbols, and further comprising:
displaying a map view button in the job information window; and
in response to activation of the map view button, displaying the one or more symbols on the map, each of the one or more symbols indicating a location on the map of an address of a job.

10. The method of claim 8 further comprising:
displaying a data entry field in the job information window, the data entry field being configured to receive job data from a system user; and
in response to receiving the job data in the data entry field, storing the job data in the system database.

11. The method of claim 8 wherein the job information window further includes an e-mail button and further comprising:
in response to activating the e-mail button, displaying an e-mail generation window that includes a plurality of buttons, each button being associated with a type of e-mail.

12. The method of claim 11, wherein the types of e-mails include a thank-you e-mail, a reconsider e-mail, and a custom e-mail.

13. The method of claim 11 further comprising:
in response to activating one of the plurality of buttons, automatically generating an e-mail populated with data from the system database.

14. A mobile sales tracking system comprising:
a system database;
a first mobile device in communication with the system database; and
a second mobile device in communication with the system database, wherein
the first mobile device is configured to:
display a first screen including a first icon,
in response to activation of the first icon, display a second screen that includes an address field and a notes field,
receive address data in the address field and notes data in the notes field, and
transmit the address data and the notes data to the system database,
the system database is configured to:
receive the transmitted data and generate a database file associated with a first location defined by the address data in the address field and containing the address data and the notes data, and
receive a query defining a second location from the second mobile device, and
transmit a response to the second mobile device including at least a portion of the address data and the notes data, and
the second mobile device is configured to:
in response to the second location being within a search radius of the first location, display a symbol that indicates the first location on a map; and
in response to activation of the symbol, display at least the portion of the address data and the notes data in the database file.

15. The mobile sales tracking system of claim 14, wherein the second mobile device is further configured to:
display a second icon, wherein
the map is displayed in response to activation of the second icon, and the symbol is one of a plurality of symbols indicating locations on the map of addresses associated with a plurality of database files in the system database; and
in response to activation of one of the symbols displayed on the map, displaying at least the portion of the data in the database file associated with the activated symbol.

16. The system of claim 14 wherein the second mobile device is further configured to:
display a third screen that includes a jobs window that displays one or more job data fields, and
in response to selecting one of the one or more job data fields in the third screen, display a job information window that includes information about a job associated with the selected job data field.

17. The system of claim 16 wherein the second mobile device is further configured to:
display a data entry field in the job information window, the data entry field being configured to receive job data from a system user; and
in response to receiving the job data in the data entry field, store the job data in the system database.

* * * * *